United States Patent [19]

Hutchison et al.

[11] 4,279,934

[45] Jul. 21, 1981

[54] METHOD FOR IMPROVING THE ODOR, FLAVOR AND COLOR OF CANNED OCEAN CLAM PRODUCTS

[75] Inventors: Wayne A. Hutchison, Seaford, Del.; Steven R. DeVore, Salsbury, Md.

[73] Assignee: The American Original Corporation, Seaford, Del.

[21] Appl. No.: 29,854

[22] Filed: Apr. 13, 1979

Related U.S. Application Data

[63] Continuation-in-part of Ser. No. 839,410, Oct. 5, 1977, abandoned.

[51] Int. Cl.³ .................... A22C 29/04; A23L 3/34
[52] U.S. Cl. .................... 426/262; 426/325; 426/332; 426/643; 426/407; 426/442
[58] Field of Search ............ 426/254, 262, 268, 269, 426/323, 325, 332, 643, 442, 407

[56] References Cited

U.S. PATENT DOCUMENTS

| | | | |
|---|---|---|---|
| 1,421,750 | 7/1922 | Willison | 426/509 X |
| 2,403,871 | 7/1946 | McBean | 426/510 |
| 2,413,129 | 12/1946 | Wilson | 426/269 X |
| 2,461,651 | 2/1949 | Mathiesen | 426/325 |
| 2,475,838 | 7/1949 | Johnson et al. | 426/269 |
| 2,656,275 | 10/1953 | Stevenson | 426/262 |
| 2,669,520 | 2/1954 | Fellers | 426/268 |
| 2,890,120 | 6/1959 | Makower | 426/269 |
| 3,177,079 | 4/1965 | Kuramoto et al. | 426/656 X |
| 3,231,395 | 1/1966 | Duggan et al. | 426/269 |
| 3,308,113 | 3/1967 | Johnsen et al. | 426/259 X |
| 3,468,669 | 9/1969 | Boyer et al. | 426/802 X |
| 3,468,674 | 9/1969 | Levin | 426/332 X |
| 3,471,300 | 10/1969 | Wendt | 426/407 |
| 3,529,975 | 9/1970 | Gray | 426/643 |
| 3,712,821 | 1/1973 | Ronsivalli et al. | 426/643 X |
| 3,851,078 | 11/1974 | Khayat et al. | 426/643 X |
| 3,852,489 | 12/1974 | Yip | 426/268 X |
| 3,859,450 | 1/1975 | Alsina | 426/332X |
| 3,959,501 | 5/1976 | Shatila | 426/269 |
| 3,982,030 | 9/1976 | Alsina | 426/332 X |

FOREIGN PATENT DOCUMENTS

| | | | |
|---|---|---|---|
| 376 | of 1868 | United Kingdom | 426/332 |
| 1350 | of 1870 | United Kingdom | 426/262 |
| 945038 | 12/1963 | United Kingdom | . |

OTHER PUBLICATIONS

Furia, T. E., "CRC Handbook of Food Additives", 2nd Edition, vol. 1, CRC Press Inc., Cleveland, Ohio 1972, pp. 144–147.
Lopez, A., "A Complete Course in Canning", Ninth Ed., A Publication of the Canning Trade, Baltimore, Md. 1969, pp. 436 and 430.

*Primary Examiner*—Robert A. Yoncoskie
*Attorney, Agent, or Firm*—Schuyler, Banner, Birch, McKie & Beckett

[57] ABSTRACT

Canned clam food products suitable for human consumption are prepared from the previously under-utilized ocean quahog clam. The products, which have an improved color, odor and flavor are prepared by contacting an ocean quahog clam product with a treating agent which provides the $SO_2$-moiety in the presence of water. Preferred treating agents are $SO_2$ gas, sulfurous acid, sodium bisulfite and sodium metabisulfite. The treating agents may be contacted with the clams at any stage in the processing from catch to can.

33 Claims, No Drawings

METHOD FOR IMPROVING THE ODOR, FLAVOR AND COLOR OF CANNED OCEAN CLAM PRODUCTS

This application is a continuation-in-part of application Ser. No. 839,410, filed Oct. 5, 1977, and now abandoned.

This invention relates to a method of preparing an improved clam food product from ocean quahog clams.

Until recently, most clam food products have been based on the surf clam (*Spisula solidissima*). The great popularity of this clam specie as a food source has led, however, to over-fishing and a serious decline in the surf clam population. As the surf clam became more scarce, responsible governmental bodies such as the U.S. National Marine Fisheries Service have imposed strict limits on surf clam harvesting. Thus, the fishing and seafood processing industries have been forced to look to other clam species as possible replacements for the surf clam.

The ocean quahog clam (*Arctica islandica*) (sometimes referred to as ocean clams, eskimo clams, mahogany clams or blacks) is found in abundance on both sides of the Atlantic Ocean. The U.S. government and clam industry have been actively seeking ways to utilize ocean quahogs as substitutes for surf clams. See the report entitled "Evaluation of the Potential for More Aggressive Use of the Ocean Quahog," prepared by Foster D. Snell, Inc. for the National Marine Fisheries Service, Jan. 28, 1977; and the report entitled "Surf Clam and Ocean Quahog Industries-Fishery Management Plan" appearing in the Federal Register, Vol. 42, No. 227, Nov. 25, 1977, pp. 60438-60505.

Ocean quahogs, however, possess a number of distinctive characteristics which have severely limited their use as an across-the-board substitute for surf clams. When raw ocean quahog meat or juice is subjected to in-can retorting in the canning process, the canned product tends to develop an off flavor color and odor. Canned surf clam meat is relatively white and has no characteristic strong odor or flavor. Canned ocean quahog meat, however, generally possesses an offensive color and has a strong, grassy flavor note reminescent of sea weed. The canned ocean quahog also has an offensive $H_2S$ odor. While the severity of these flavor, odor and color problems may vary with time and location of the harvest, these problems have prevented the full potential utilization of ocean quahog clams as a substitute for surf clams.

Most attempts to utilize ocean quahogs have been directed to the development of product types or categories in which the product color is not critical or could be masked, such as Manhattan clam chowder, stuffed clams, clam sticks and clam pie. Dried products and blends with bland fish such as haddock or cod have also been suggested to avoid the problems associated with ocean quahogs. See, e.g., Ronsivalli, U.S. Pat. No. 3,712,821 and Gray, U.S. Pat. No. 3,529,975. Those attempts to use ocean quahogs in canned products as minced clams or New England clam chowder have resulted in undesirable development of off flavor, odor and color which remain unmasked.

Attempts to improve the edibility of ocean quahog and similar clam species have largely focused on mechanical steps in the clam processing scheme such as the removal of black fuzz from the shell or removal of the "belly" material from the remaining clam meat. Another attempt to render these clam species more edible has involved the use of dry steam to drive off flavor and odor influencing materials. See, Wendt, U.S. Pat. No. 3,471,300. All of the prior art attempts have failed to achieve a clam food product which, upon canning, has flavor, odor and color characteristics comparable to the popular but increasingly scarce surf clam specie.

It is, therefore, an object of the present invention to solve the edibility problem with the ocean quahog clam, heretofore unsolved by the prior art.

More specifically, it is an object of the present invention to provide a method for treating ocean quahog clams and/or their meat or juice to provide a product which has improved odor, color and flavor upon canning.

In accordance with these and other objectives the instant invention provides a method for treating an ocean quahog clam product which may be subsequently canned without the development of off flavor, odor or color, which method comprises contacting said clam product with a treating agent which provides the $SO_2$-moiety in the presence of water, said treating agent being present in an amount sufficient to prevent the formation of off flavor, odor and color during in-can retorting.

The present invention also provides a method for preparing a canned ocean quahog clam food product having improved color, odor and flavor, which method comprises the steps of:

(a) contacting an ocean quahog clam product with a treating agent which provides the $SO_2$-moiety in the presence of water;

(b) placing the treated clam product in a container;

(c) sealing said container; and (d) subjecting the sealed container to conditions of temperature and pressure sufficient to produce a sterilized canned product;

said treating agent being present in an amount sufficient to prevent the formation of off flavor, odor and color during the treatment of step (d).

In the conventional preparation of clams for canning the clams are shucked, preferably debellied, washed and cut or ground into suitable sized pieces. These pieces of raw clam meat are than placed in a can containing either expressed clam juices or water and the can is sealed and retorted. During the in-can retorting the raw clam meat is cooked. Unlike surf clam meat, however, ocean quahog clam meat and juice develop an undesirable color and an offensive sulfide taste and odor during the in-can retorting step of the canning process.

Applicants have surprisingly discovered that the formation of undesirable flavor, odor and color during in-can retorting of ocean quahog clams can be substantially prevented by treating the clam meat and/or juice with a treating agent which provides the $SO_2$-moiety in the presence of water. Included in this class are sulfur dioxide gas, sulfurous acid and the water soluble salts of sulfurous acid. Preferred agents are the alkali and ammonium salts of sulfurous acid such as sodium sulfite, sodium bisulfite, sodium metabisulfite, potassium sulfite, potassium bisulfite, potassium metabisulfite and ammonium sulfite. The most preferred treating agents are sulfur dioxide, sulfurous acid, sodium bisulfite and sodium metabisulfite.

While it was originally thought that only sodium bisulfite and sodium metabisulfite gave significant and consistent improvement in the color, odor and flavor of canned ocean quahog clam products, it has now been found that all the above-described SO₂-moiety providing agents provide a significant reduction of the H₂S/grassy odor and flavor notes and a significant improvement in the meat and juice color when employed at proper levels and under appropriate conditions as described more fully below.

SO₂ and SO₂-moiety providing compounds have been used as a preservative or treating agent for various food materials such as fresh fruits and vegetable, vegetable protein substitutes and certain types of seafood such as crabs, shrimp and fish such as ling hake. See, e.g., Stevenson, U.S. Pat. No. 2,656,275; Mathieson, U.S. Pat. No. 2,461,651; Shatila, U.S. Pat. No. 3,959,501; Wilson, U.S. Pat. No. 2,413,129; Johnson, U.S. Pat. No. 2,475,838; Makower, U.S. Pat. No. 2,890,120; and Kuramoto. U.S. Pat. No. 3,177,079. Applicants are aware of no teaching, however, that such agents can be useful in the treatment of clams and more particularly in prevention of off flavor, odor and color development of ocean quahog clams during canning. While sodium bisulfite-treated potatoes have been used in clam chowder formulation there has been no recognition that such an SO₂-moiety providing agent is available for or has any beneficial effect on the clam meat or juice in the chowder.

The successful results obtained by the process of the present invention are certainly unexpected in light of the observations by Alsina in U.S. Pat. No. 3,982,030 and U.S Pat. No. 3,859,450 that sodium metabisulfite was not only ineffective to prevent melanosis (discoloration) in frozen shellfish but that use of this material adversely affected the taste and color of treated seafood.

Applicants have surprisingly discovered that the flavor, odor and color of canned ocean quahog clam products can be improved by contacting the clams with the treating agent of the present invention at any stage in the conventional clam processing scheme prior to in-can retorting. Thus, the SO₂-moiety providing treating agent may be contacted with whole inshell clams (on shore or at sea), whole shucked clams, shucked debellied clams, or ground shucked debellied clam pieces. Moreover, the treatment can be applied to clam meat/clam juice mixtures or individually to meat and/or juices. In some cases the treatment may even take place after the clam meat or juice is incorporated into a composite clam food product such as clam chowder.

The contact step can take a number of forms. In general, the treating agent is contacted with the clam product as an aqueous solution. Since clams contain a large percentage of water, the solution of treating agent may be formed in situ, for example, by passing SO₂ gas through the clams. An aqueous solution of the treating agent can also be formed by bubbling SO₂ gas through water or by dissolving a soluble SO₂-moiety providing compound in water.

One preferred method for treating whole clams, shucked clams, debellied clams and even ground clam pieces is to allow the product to soak in a solution containing the SO₂-moiety providing agent. Soaking times will vary with the type of equipment employed and the severity of problems exhibited by the particular clams being treated. In general, soaking times of from about 10 minutes to about 4 hours are preferred although longer or shorter periods may be employed. In the case of ground clam pieces, good results have been achieved after about 30 minutes soaking time. Soaking at ambient temperatures are preferred although higher and lower temperatures may be employed. In the preferred form of the process of the present invention, excess free treating agent is removed from the clam product by washing, e.g., with water.

In another preferred embodiment, the treating agent is added to ground clam meat during a precooking (boiling) step. In this precooking treatment, a slurry of clam meat pieces and water or expressed clam juices is brought to a boil, preferably in an open kettle. The boiling step should be of relatively short duration whereby the clam meat is heated but not cooked to the point of protein denaturation. In general, times of at least about one minute can be employed. Preferred are boiling times of from about 1 to 5 minutes. In practice, the clam meat slurry is optimally boiled for about 2 to 3 minutes. The clam meat slurry preferably contains from about 50% to about 75% raw clam meat although higher and lower levels may be employed. In carrying out the contacting step of this embodiment, the treating agent is preferably added after the slurry has been brought to a boil. In practice, the slurry is boiled about 2 to 3 minutes before agent addition and about 1 to 2 minutes after addition. The agent may, however, be added before the slurry is brought to a boil.

Another embodiment of the present invention envisions contacting either raw or precooked meat with the treating agent in the can immediately before sealing and retorting.

The treating agent of the present invention should be employed in an amount effective to prevent the formation of off flavor, odor and color during in-can retorting of the clam product. The amount of agent employed, however, should not exceed the level of which residual excess SO₂ or cation moieties introduce new objectionable odor or flavor notes to the calm product.

In general, the amount of treating agent needed to achieved the stated objective will vary somewhat with the particular agent employed—primarily due to different levels of available SO₂-moiety. Table 1 sets out the percentage of available SO₂ for some of the treating agents of the present invention.

TABLE 1

| | |
|---|---|
| sodium bisulfite | 61.56% SO₂ |
| sodium metabisulfite | 67.40% SO₂ |
| ammonium sulfite | 55.17% SO₂ |
| sulfurous acid | 6.0% SO₂ |
| potassium sulfite | 40.48% SO₂ |
| potassium metabisulfite | 57.64% SO₂ |
| sodium sulfite | 50.83% SO₂ |

When the treating agent of the present invention is an alkali or ammonium salt of sulfurous acid, the minimum effective level of addition is about 0.02% by weight, based on the clam meat. For sulfurous acid solutions, including those formed in situ by bubbling SO₂ gas through water, an equivalent minimum level can be calculated based on the available SO₂-moiety in the solution.

The preferred treating agent levels will depend on the particular method of contact employed. When the clam product is soaked in the agent and then washed or is added to a boiling slurry, the removal of excess agent is enhanced. In this mode of operation treating agent additions in the range of from about 0.2 to about 0.3% by weight based on the meat are preferred for the agents having a SO₂ content similar to sodium bisulfite. As described above, equilavent ranges for other agents, such as sulfurous acid, can be readily calculated.

When the treating agent of the present invention is added directly to the can just prior to sealing, there is less chance for excess agent escape, and therefore, smaller amounts are preferred. In practice treating agent additions in the range of from about 0.05 to about 0.125% by weight are preferred when addition directly to the can is employed. This range is also based on the level of $SO_2$ available from salts such as sodium bisulfite, and appropriate calculations for other agents can be made in the manner described above.

The upper limit of treating agent addition can be determined by monitoring the effect on the agent on the canned product. If the agent is employed at too high a level, new flavor and odor problems may be introduced, despite the removal of problems associated with the untreated product. Too much residual $SO_2$ may give the treated product a mildly astringent flavor and/or odor. When the product is washed or boiled after treatment as described above, the residual $SO_2$ levels are usually lower. As a general rule, residual $SO_2$ in the treated product should not exceed about 300 ppm. In practice, residual $SO_2$ levels in the range of from about 50 to about 150 ppm are easily achieved.

The flavor and odor of treated clam products in some instances may also be affected somewhat by the presence of residual cation moieties. For example, ammonium sulfite addition may, under certain circumstances, result in the formation of a slight amine or ammonia odor in the treated product. Similarly, the use of potassium salts may introduce a slight "metallic" note to the product. In general, the preferrd additive amounts indicated above will not cause problems of this type. If such collateral odor or taste problems should occur, the agent levels can be lowered slightly or the problem can be treated by any of the known methods, e.g., with flavoring additives or agents to neutralize or mask these odors or flavors.

The pH of the treating agent chosen may also have an effect on the final product, especially where the agent is added directly to the meat in the can. Clam meat slurries generally have a pH in the range of from about 5.8 to about 6.8. The in-can addition of certain of the treating agents of the present invention, e.g., sodium, potassium and ammonium sulfite, may result in a slurry pH above 7. When this occurs the clam meat may get a mushy texture and the flavor may be affected somewhat. The problems associated with a high pH treating agent can be easily avoided by adding a suitable acid such as citric acid, phosphoric acid, or sulfurous acid in an amount sufficient to keep the clam meat slurry pH in the normal range.

When carrying out the practice of the present invention it is preferred to add a chelating agent such as EDTA-phosphate solution to the clam meat in known manner to reduce shrinkage, and act as a metal ion sequestering agent although this addition is not necessary.

After the clam meat has been treated according to one of the above-described embodiments, the meat is placed in cans along with salt and enough water or expressed clam juice to fill the can. The can is then sealed and retorted under conventional conditions. Generally, retorting is effected in a steam pressured still retort equipped with temperature and pressure controls as commonly used in the food industry to provide commercially sterilized canned food products, e.g., at temperatures ranging from 240° to 244° F., at pressures of 11 to 12 psig and for times of about 70 to 105 minutes, or as determined to be necessary to produce a commercially sterile product in the size container employed.

The following Examples are included for illustrative purposes only and are not intended to limit the scope of the invention.

EXAMPLE 1

This example illustrates one embodiment of the present invention in which the treating agent is added to precooked clam meat in the can just prior to sealing and retorting. 3,720 grams of diced debellied ocean quahog clam meat, 3,000 grams of water and 100 milliliters of EDTA-phosphate solution were added to an open 20 l. kettle, and the resulting slurry was heated to boiling for a period of about 5 minutes. The precooked clam meat was then separated from the kettle juices by screening and filled into cans. 7 grams of sodium bisulfite were then added to the meat in the cans and the cans were sealed and retorted for 105 minutes at 240° F. The resulting canned product was free of the repulsive green color and disagreeable sulfide odor and taste usually associated with ocean quahog meat.

EXAMPLE 2

This example illustrates the embodiment of the present invention wherein the treating agent is added to a clam meat slurry during precooking. 1,200 pounds of diced debellied ocean quahog clam meat, 48 gallons of water and 4.5 gallons of EDTA phosphate solution were combined in a 250 gallon steam jacketed, open kettle. The resulting slurry was brought to a boil and boiled for a period of 2 minutes. During the boiling period, 3 pounds of sodium bisulfite was stirred into the slurry. The slurry was then pumped to Sweco screens to separate the meat and liquid. The precooked meat was filled into cans (approximately 19-20 ounces per can) along with a salt tablet and juice or a water-juice mixture. The cans were then sealed and retorted for 105 minutes at 240° F. The canned product was free of repulsive green color and disagreeable sulfide odor and taste.

EXAMPLE 3

This example illustrates the embodiment of the present invention wherein the treating agent is contacted with the clam meat in a soaking step. Shucked and debellied ocean quahog clams were ground through a ⅜ inch die. 1000 gram portions were slurried with 1000 grams of cold tap water (50°-60° F.) containing the various $SO_2$ providing agents listed below. The agents were added in an amount to give $SO_2$ quantities equivalent to that provided by 2 grams of sodium bisulfite. The clam meat was soaked in the aqueous solution for about 30 minutes. Each rinse was a 2 minute swirl with 1000 ml of cold tap water. The rinsed clam meat was then precooked (i.e., boiled) for 5 minutes with 800 ml of a water solution containing 0.58% sodium tripolyphosphate and 0.15% EDTA. The cooked meat was drained (recovery—15 to 17 oz.), filled into a 404×700 can with a 250 grain salt tablet and topped with hot tap water. The cans were sealed and retorted. Results are given in Table 2. All treated samples showed improvements in color of meat and juices and no grassy odor and taste as compared to the untreated control.

TABLE 2

| Agent | Grams Used | Odor | Taste | Juice Color | Meat Color | Meat Texture | pH |
|---|---|---|---|---|---|---|---|
| control none | 0 | H2S grassy | eggy-grassy | light green | light tan | firm | 6.6 |
| sodium bisulfite | 2 | no H2S or grassy | no eggy or grassy | blue green | very light tan | very light tan | 6.8 |
| sodium metabisulfite | 1.8 | no H2S or grassy | no eggy or grassy | blue green | very light tan | very light tan | 6.6 |
| ammonium sulfite | 2.2 | no H2S or grassy | no eggy or grassy | blue green | very light tan | very light tan | 6.8 |
| sulfurous acid | 20.5 | no H2S or grassy | no eggy or grassy | blue green | very light tan | very light tan | 6.5 |
| potassium sulfite | 3. | no H2S or grassy | no eggy or grassy | blue green | very light tan | very light tan | 6.8 |
| potassium bisulfite | 2.1 | no H2S or grassy | no eggy or grassy | blue green | very light tan | very light tan | 6.6 |
| sodium | 2.4 | no H2S or grassy | no eggy or grassy | blue green | very light tan | very light tan | 6.4 |

EXAMPLE 4

This example demonstrates the use of pH control when adding the treating agent of the present invention directly to the can. Shucked debellied ocean quahog clams were ground, washed in tap water and then boiled in water containing 0.58% sodium tripolyphosphate and 0.15% EDTA. The meat was then drained for 1 minute and 20 oz. portions were added to 404×700 cans. The agents shown below were combined with 1 gram of citric acid and dissolved in the hot water used to top off the cans. The cans were then sealed and retorted. Results are given in Table 3. The treated samples showed an improvement in color odor and taste. It is suspected that the lack of improvement in color when employing the ammonium sulfite agent was due to reduced potency (i.e., available $SO_2$) due to the tendency of this agent to break down upon extended storage.

TABLE 3

| Agent with 1 g. citric acid | Grams added | Odor | Taste | Juice Color | Meat Color | Meat Texture | pH |
|---|---|---|---|---|---|---|---|
| control (with acid) | 0 | grassy | grassy | green | light tan | firm | 5.9 |
| ammonium sulfite | 1.1 | no grassy | no grassy | green | light tan | " | 6.1 |
| potassium sulfite | 1.5 | no grassy good | no grassy good | light green | very light tan | " | 6.3 |
| potassium bisulfite | 1.1 | no grassy tuna fish | no grassy slight bitter aftertaste | light green | very light tan | " | 6.2 |
| sodium sulfite | 1.2 | no grassy good | no grassy good | light green | very light tan | " | 6.3 |
| control (without acid) | 0 | grassy liver odor | grassy | green | light tan | " | 6.6 |

While certain specific embodiments of the invention have been described with particularity herein, it should be recognized that modifications thereof will occur to those skilled in the art. Therefore, the scope of the invention is to be limited solely by the scope of the claims appended hereto.

We claim:

1. A method for treating an ocean quahog clam which is suitable for canning without the development of off-flavor, odor, or color, which method comprises contacting said clam product with a treating agent selected from the group consisting of sodium bisulfite, sodium metabisulfite, and mixtures thereof, said treating agent being present in an amount sufficient to prevent the formation of off-flavor, odor and color during in-can retorting.

2. A method for preparing a canned ocean quahog clam food product having improved color, odor and flavor, said method comprising the steps of:
   (a) contacting an ocean quahog clam product with a treating agent selected from the group consisting of $SO_2$ gas, sulfurous acid, sodium sulfite, potassium sulfite, potassium bisulfite, potassium metabisulfite, ammonium sulfite and mixtures thereof;
   (b) sealing the treated clam product in a container; and (c) subjecting the sealed container to conditions of temperature and pressure sufficient to produce a sterilized canned product;

said treating agent being present in an amount sufficient to prevent the formation of off-flavor, odor and color during the treatment of step (c).

3. The method of claims 1, 2 wherein said ocean quahog clam product comprises whole inshell ocean quahog clams.

4. The method of claims 1, 2 wherein said ocean quahog clam product comprises whole shucked ocean quahog clams.

5. The method of claims 1, 2 wherein said ocean quahog clam product comprises shucked, debellied ocean quahog clams.

6. The method of claims 1, 2 wherein said ocean quahog clam product comprises ground, shucked, debellied ocean quahog clam pieces.

7. The method of claims 1, 2 wherein said ocean quahog clam product comprises expressed juices from ocean quahog clams.

8. The method of claims 1, 2 wherein said ocean quahog clam product comprises clam chowder containing ocean quahog clams.

9. The method of claim 1, 2 wherein said contacting is effected by bubbling $SO_2$ gas through an aqueous solution containing said clam product.

10. The method of claims 1, 2 wherein said contacting is effected by soaking said clam product in an aqueous solution containing said treating agent.

11. The method of claim 10 further comprising the step of washing the treated clam product to remove excess treating agent.

12. The method of claims 1, 2 additionally comprising the step of boiling an aqueous solution containing said clam product for a time less than that required for protein denaturization.

13. The method of claim 12 wherein said contacting is effected by adding said treating agent to said aqueous solution just prior to or during said boiling.

14. The method of claims 2 or 1 wherein said contacting is effected by adding said treating agent to said clam product after it is placed in said container.

15. The method of claim 1 or 2 wherein the treated clam product has a pH below about 7.

16. The method of claim 15 wherein a food-grade acid is added to said treated clam product to maintain the pH below about 7.

17. The method of claim 1 or 2 wherein said treating agent is $SO_2$ gas.

18. The method of claim 1 or 2 wherein said treating agent is sulfurous acid.

19. The method of claims 1, 2 wherein said treating agent is added in an amount of at least about 0.02% by weight based on said clam product.

20. An ocean quahog clam meat product produced by the method of claim 6.

21. An ocean quahog clam juice product produced by the method of claim 7.

22. A method for preparing a canned ocean quahog clam food product having improved color, odor and flavor, said method comprising the steps of:

(a) forming a slurry of shucked, debellied, ground ocean quahog clam meat in water or expressed juices;

(b) bringing said slurry to a boil;

(c) adding to said boiling slurry at least about 0.02% by weight based on said meat of a treating agent selected from the group consisting of sodium bisulfite, sodium metabisulfite and mixtures thereof;

(d) placing the treated clam meat slurry in a container;

(e) sealing said container; and (f) subjecting the sealed container to conditions of temperature and pressure sufficient to produce a sterilized canned product.

23. A canned ocean quahog clam food product having improved color, odor and flavor produced by the method of claim 22.

24. A method for preparing a canned ocean quahog clam food product having improved color, odor and flavor, said method comprising the steps of:

(a) contacting an ocean quahog clam product with a treating agent selected from the group consisting of sodium bisulfite, sodium metabisulfite, and mixtures thereof;

(b) sealing the treated clam product in a container; and (c) subjecting the sealed container to conditions of temperature and pressure sufficient to produce a sterilized canned product;

said treating agent being present in an amount sufficient to prevent the formation of off-flavor, odor and color during the treatment of step (c).

25. A method for preparing a food product suitable for human consumption from shucked, debellied ocean quahog clam meat, said product being free from disagreeable odor, color and flavor, said method comprising the steps of:

(a) adding to said shucked, debellied ocean quahog meat a treating agent selected from the group consisting of sodium bisulfite, sodium metabisulfite or mixtures thereof;

(b) sealing the mixture of clam meat and treating agent in a container; and (c) subjecting the sealed container to conditions of temperature and pressure sufficient to produce a sterilized canned food product;

said treating agent being added in an amount effective to prevent the formation of off-flavors, odors and colors during the treatment of step (c).

26. The method of claim 25 wherein said agent is added to said meat after said meat is placed in said container.

27. The method of claim 26 additionally comprising the step of boiling a slurry of said meat in water or expressed clam juices for at least one minute but for a time less than that required for protein denaturization prior to placing said meat in said container.

28. The method of claim 25 wherein said agent is added to said meat before said meat is placed in said container.

29. The method of claim 28 wherein said agent is added to a slurry of said meat in water or expressed clam juices.

30. The method of claim 29 additionally comprising the step of boiling the agent-containing slurry for at least one minute but for a time less than that required for protein denaturization.

31. The method of claim 25 wherein said agent is added in an amount of at least about 0.02% by weight based on said meat.

32. The method of claim 30 wherein said agent is added to said slurry in an amount of from about 0.25 to about 0.30% by weight based on said meat.

33. A clam meat food product free of disagreeable odor, color and flavor produced by the method of claim 25.

* * * * *

UNITED STATES PATENT AND TRADEMARK OFFICE
CERTIFICATE OF CORRECTION

PATENT NO. : 4,279,934  Page 1 of 2

DATED : July 21, 1981

INVENTOR(S) : Wayne A. Hutchison and Steven R. DeVore

It is certified that error appears in the above—identified patent and that said Letters Patent is hereby corrected as shown below:

Column 2, line 9, after "problem", insert -- associated --.

Column 4, line 35, "calm" should read -- clam --.

Column 7, Table 2 should be as follows:

TABLE 2

| Agent | Grams Used | Odor | Taste | Juice Color | Meat Color | Meat Texture | pH |
|---|---|---|---|---|---|---|---|
| control none | 0 | $H_2S$ grassy | eggy-grassy | light green | light tan | firm | 6.6 |
| sodium bisulfite | 2 | no $H_2S$ or grassy | no eggy or grassy | blue green | very light tan | firm | 6.8 |
| sodium metabisulfite | 1.8 | no $H_2S$ or grassy | no eggy or grassy | blue green | very light tan | firm | 6.6 |
| ammonium sulfite | 2.2 | no $H_2S$ or grassy | no eggy or grassy | blue green | very light tan | firm | 6.8 |
| sulfurous acid | 20.5 | no $H_2S$ or grassy | no eggy or grassy | blue green | very light tan | firm | 6.5 |
| potassium sulfite | 3. | no $H_2S$ or grassy | no eggy or grassy | blue green | very light tan | firm | 6.8 |
| potassium bisulfite | 2.1 | no $H_2S$ or grassy | no eggy or grassy | blue green | very light tan | firm | 6.6 |
| sodium sulfite | 2.4 | no $H_2S$ or grassy | no eggy or grassy | blue green | very light tan | firm | 6.4 |

UNITED STATES PATENT AND TRADEMARK OFFICE
CERTIFICATE OF CORRECTION

PATENT NO. : 4,279,934

DATED : July 21, 1981

INVENTOR(S) : Wayne A. Hutchison and Steven R. DeVore

It is certified that error appears in the above—identified patent and that said Letters Patent is hereby corrected as shown below:

Column 9, line 7, after "2", insert -- or 24 --.

Column 9, line 10, after "2", insert -- or 24 --.

Column 9, line 13, after "2", insert -- or 24 --.

Column 9, line 16, after "2", insert -- or 24 --.

Column 9, line 19, after "2", insert -- or 24 --.

Column 9, line 22, after "2", insert -- or 24 --.

Column 9, line 25, delete "1".

Column 9, line 28, after "2", insert -- or 24 --.

Column 9, line 34, after "2", insert -- or 24 --.

Column 9, line 41, "1" should read -- 24 --.

Column 9, line 53, after "2", insert -- 24 --.

Signed and Sealed this

Seventeenth Day of November 1981

[SEAL]

Attest:

GERALD J. MOSSINGHOFF

*Attesting Officer*     *Commissioner of Patents and Trademarks*